United States Patent
Hillesund et al.

(10) Patent No.: US 10,613,241 B2
(45) Date of Patent: Apr. 7, 2020

(54) STREAMER MANUFACTURING

(71) Applicant: PGS Geophysical AS, Oslo (NO)

(72) Inventors: Øyvind Hillesund, Oslo (NO); Geir Andre Motzfeldt Drange, Oslo (NO); Oeystein Traetten, Oslo (NO); Bengt Finnøen, Oslo (NO)

(73) Assignee: PGS Geophysical AS, Oslo (NO)

( * ) Notice: Subject to any disclaimer, the term of this patent is extended or adjusted under 35 U.S.C. 154(b) by 315 days.

(21) Appl. No.: 15/615,277

(22) Filed: Jun. 6, 2017

(65) Prior Publication Data

US 2017/0371049 A1 Dec. 28, 2017

Related U.S. Application Data

(60) Provisional application No. 62/357,155, filed on Jun. 30, 2016, provisional application No. 62/354,175, filed on Jun. 24, 2016.

(51) Int. Cl.
*G01V 1/20* (2006.01)
*G01V 1/18* (2006.01)

(52) U.S. Cl.
CPC .......... *G01V 1/201* (2013.01); *G01V 1/189* (2013.01); *G01V 1/202* (2013.01)

(58) Field of Classification Search
CPC ......... G01V 1/189; G01V 1/201; G01V 1/202
USPC .......................................... 367/20, 153, 154
See application file for complete search history.

(56) References Cited

U.S. PATENT DOCUMENTS

| 3,713,085 A | | 1/1973 | Laurent et al. |
| 4,638,469 A | | 1/1987 | Bryant et al. |
| 4,736,345 A | | 4/1988 | Keckler et al. |
| 5,251,182 A | * | 10/1993 | Carpenter .............. G01V 1/208 |
| | | | 174/101.5 |
| 5,265,066 A | * | 11/1993 | Svenning ............. G01V 1/3808 |
| | | | 367/154 |
| 5,592,437 A | * | 1/1997 | Elliott .................... G01V 1/201 |
| | | | 340/521 |

(Continued)

FOREIGN PATENT DOCUMENTS

| EP | 2293115 | | 3/2011 |
| EP | 2843444 | A2 | 4/2015 |

(Continued)

OTHER PUBLICATIONS

Search Report for European Patent Application No. 17176582.9; dated Oct. 10, 2017; 8 pages.

*Primary Examiner* — Ian J Lobo

(57) ABSTRACT

A method of manufacturing a streamer section. The method includes coupling together a plurality of prefabricated harness modules. A harness module includes a plurality of geophysical sensors disposed along a length of the harness module and a sensor node communicatively coupled to the plurality of sensors. A first connector is disposed at a first end of the harness module and a second connector disposed at a second end of the harness module. The first connector is coupled to the sensor node and is configured to couple to a second harness module and receive data from a sensor node in the second harness module. The second connector is coupled to the sensor node and is configured to couple to a third harness module and forward data to a sensor node in the third harness module.

18 Claims, 13 Drawing Sheets

(56) References Cited

U.S. PATENT DOCUMENTS

| | | | |
|---|---|---|---|
| 5,883,857 A * | 3/1999 | Pearce | G01V 1/201 367/20 |
| 5,943,293 A | 8/1999 | Luscombe et al. | |
| 6,229,706 B1 | 5/2001 | Cook et al. | |
| 6,229,760 B1 | 5/2001 | Ambs | |
| 6,879,546 B2 | 4/2005 | Halvorsen et al. | |
| 8,098,542 B2 * | 1/2012 | Hillesund | G01V 1/38 367/20 |
| 9,322,942 B2 * | 4/2016 | Mellier | G01V 1/00 |
| 9,377,545 B2 | 6/2016 | Sudow et al. | |
| 2011/0310698 A1 * | 12/2011 | Maples | G01V 1/184 367/20 |
| 2011/0317517 A1 * | 12/2011 | Borresen | G01V 1/3808 367/21 |
| 2012/0081994 A1 | 4/2012 | Husom et al. | |
| 2015/0063063 A1 * | 3/2015 | Sudow | G01V 1/201 367/16 |
| 2015/0369946 A1 | 12/2015 | Drange | |

FOREIGN PATENT DOCUMENTS

| | | |
|---|---|---|
| WO | 9953341 | 10/1999 |
| WO | 2015170170 | 11/2015 |

\* cited by examiner

STREAMER MANUFACTURING

CROSS-REFERENCE TO RELATED APPLICATIONS

This application claims the benefit of U.S. Provisional Application Ser. No. 62/357,155 filed Jun. 30, 2016 and titled "Streamer Manufacturing" and No. 62/354,175 filed Jun. 24, 2016 and titled "Streamer Sections with Embedded Modules". The provisional applications are incorporated by reference herein as if reproduced in full below.

BACKGROUND

This disclosure is related generally to the field of marine surveying. Marine surveying can include, for example, seismic and/or electromagnetic surveying, among others. For example, this disclosure may have applications in marine surveying, in which one or more source elements are used to generate wave-fields, and sensors—either towed or ocean bottom or otherwise—receive energy generated by the source elements and affected by the interaction with the subsurface formation. The sensors thereby collect survey data which can be useful in the discovery and/or extraction of hydrocarbons from subsurface formations.

Some related art approaches to the manufacture of seismic streamers can be work-intensive. A large part of the work can be related to the insertion and splicing of the sensors and sensor network electronics into a section of the seismic streamer. This can include threading of the local wiring through the spacers and splicing in each sensor and electronics unit into a local wire bundle at the correct position. The work may be manual, and it may be tedious due to limited space in the streamer. Consequently, methods and systems that ameliorate the manual steps and and/or modularize the assembly of seismic streamers provide a competitive advantage in the art.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
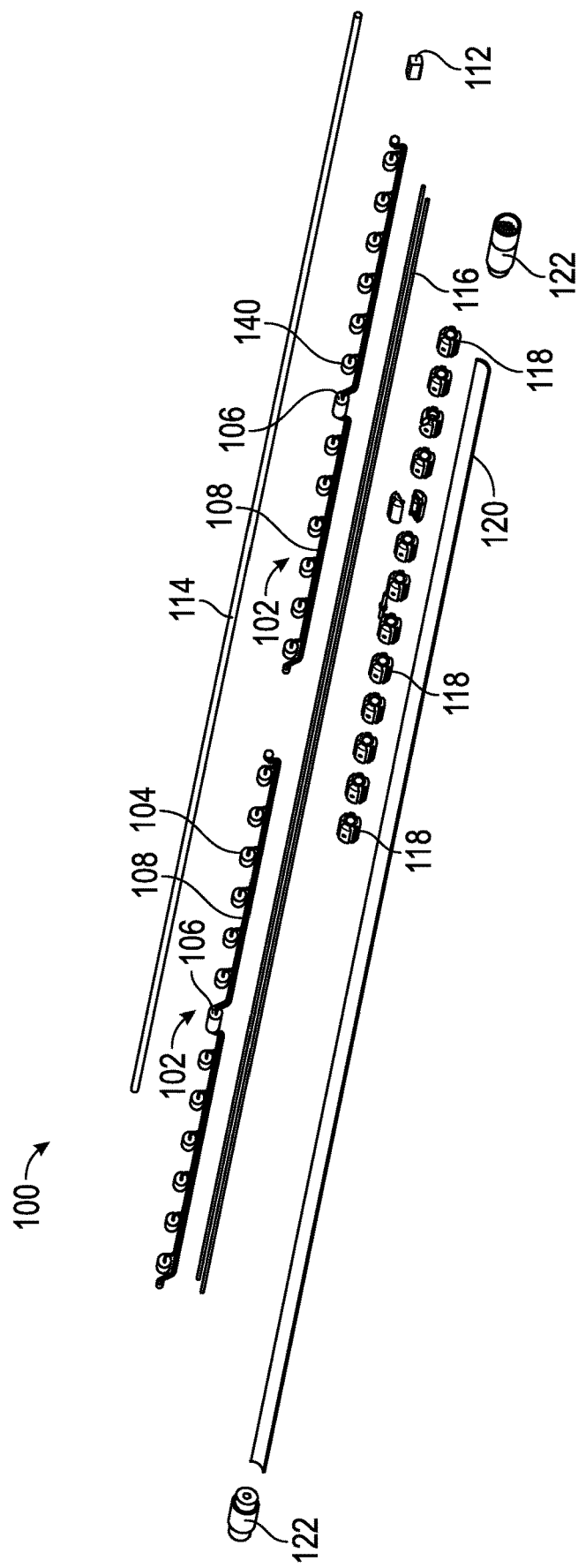
FIG. 1 shows an exploded view of a sensor streamer section in accordance with an embodiment.

FIG. 1 shows an exploded view of a sensor streamer section 100 in accordance with an embodiment. Sensor streamer includes a plurality of harness modules 102 which, as described further below, each include a plurality of geophysical sensors 104 and a sensor node 106 interconnected via cables disposed within a cable harness 108 (e.g. cables 702-1, 702-2, FIG. 7, not visible in FIG. 1). Harness modules 102 may be prefabricated as described further below in conjunction with FIG. 23. The prefabricated harness modules 102 may then be coupled together and incorporated in sensor streamer section 100. In at least some embodiments a harness module 102 may be about 6.25 meters long. Geophysical sensors 104 may include, by way of example, hydrophones, geophones and accelerometers or other particle motion sensors. The principles of the disclosure may be employed with any type of sensor typically employed in a seismic geophysical survey. Cable harness 108 will also be described further below. Although the exemplary sensor streamer section 100 is shown, for ease of illustration with two harness modules 102, a sensor streamer may include other numbers of harness modules 102. For example, in at least some embodiments, a sensor streamer 10 may include sixteen harness modules 102. Harness modules 102 may be connected together as described further below. Cable harness 108 may also include a plurality of cables (e.g. cables 704, FIG. 7, not visible in FIG. 1) to convey data obtained from the geophysical sensors 104, via sensor node 106 to other sensor nodes, in daisy-chain fashion as described below, or to a backbone node 112, also described below. When employed in a geophysical survey, backbone node 112 may provide telemetry circuits such as packet switches, as described further below, to communicate the data from the geophysical sensors 104 to data processing equipment onboard a survey vessel (not shown). Sensor streamer section 100 may also include a backbone 114 supplying electrical and optical power to the sensors 102. Backbone 114 may extend the length of sensor streamer section 100 which, in at least some example embodiments, may be about 100 meters. Strength members 116 may be included in a sensor streamer section 100 to carry the load when a geophysical survey streamer comprising sensor streamer sections 100 is towed in a water body during a geophysical survey. A plurality of spacers 118 may be disposed along the length of sensor streamer section 100 to support the cable harness 108 and strength members 116 and, in at least some embodiments, protect the geophysical sensors 104, as will be described further below. In at least some embodiments, spacers 118 may comprise an engineered thermoplastic such as an ISOPLAST® engineered polymer from Lubrizol Corporation, Wickliffe, Ohio, USA. A streamer skin 120 may be disposed as an envelope about the harness modules 102, spacers 118, strength members 116, backbone 114 and backbone node 112. End connectors 122 may be provided to interface the backbone node 112 to connections to data processing equipment on board the survey vessel or to additional sensor streamer sections 100 coupled together in a geophysical survey streamer, as described further below.

Figure 2:
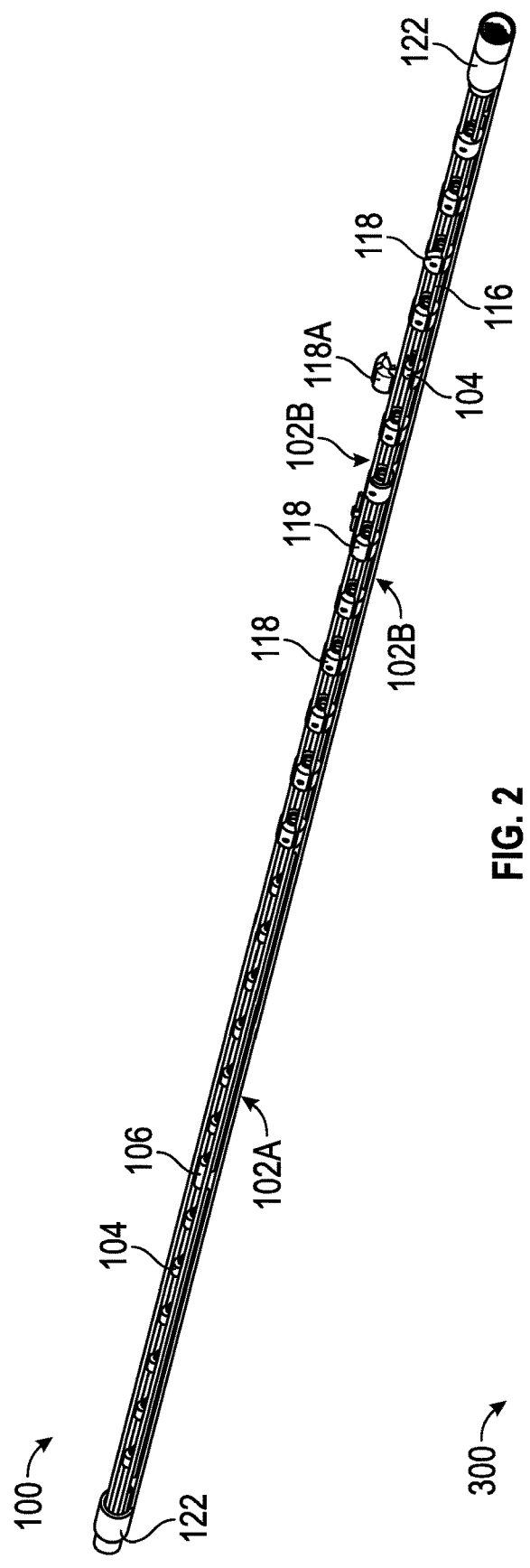
FIG. 2 shows cutaway view of a streamer section in accordance with an embodiment.

FIG. 2 shows a cutaway view of a sensor streamer section 100 in accordance with an embodiment. In FIG. 2, two coupled harness modules 102A, 102B are shown (a connection therebetween is not visible in FIG. 2). In other embodiments, any number of harness modules 102 may be coupled together within a sensor streamer section 100. In conjunction with harness module 102A, spacers have been omitted to show the geophysical sensors 104 and sensor node 106 included in harness module 102A. Spacers 118 are shown in conjunction with harness module 102B which obscures the view of geophysical sensors 104 attached to harness module 102B. One spacer, 118A, is shown in exploded view to show the relationship of a geophysical sensor 104 disposed within an interior of spacer 118A. Backbone 114 is disposed within a trench (not visible in FIG. 2) formed in a wall of spacers 118. As will be described further below, harness modules 102 and strength members 116 may be similarly disposed, although not visible in FIG. 2.

Figure 3:
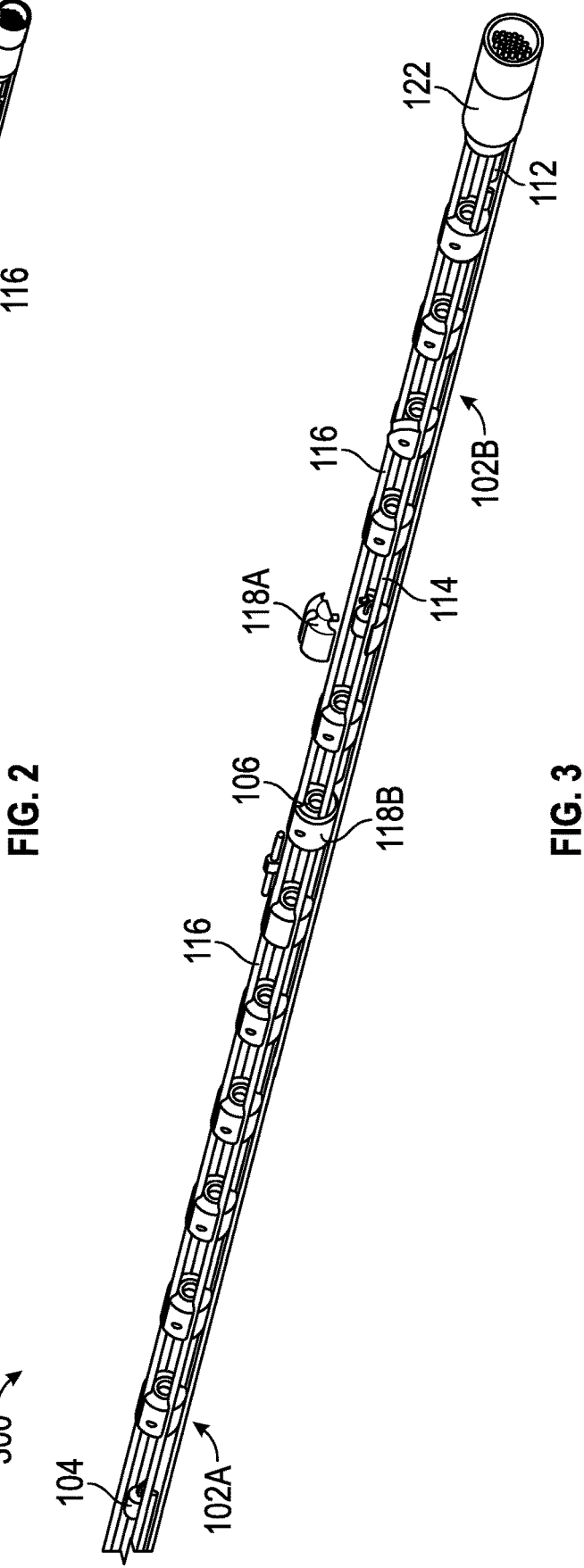
FIG. 3 shows a portion of a sensor streamer section in accordance with an embodiment.
Figure 4:
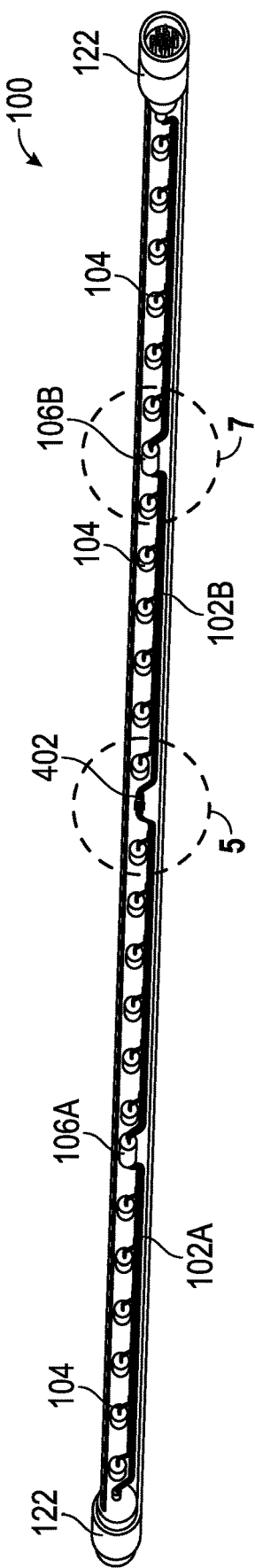
FIG. 4 shows a cutaway view of a sensor streamer section in accordance with an embodiment.
Figure 5:
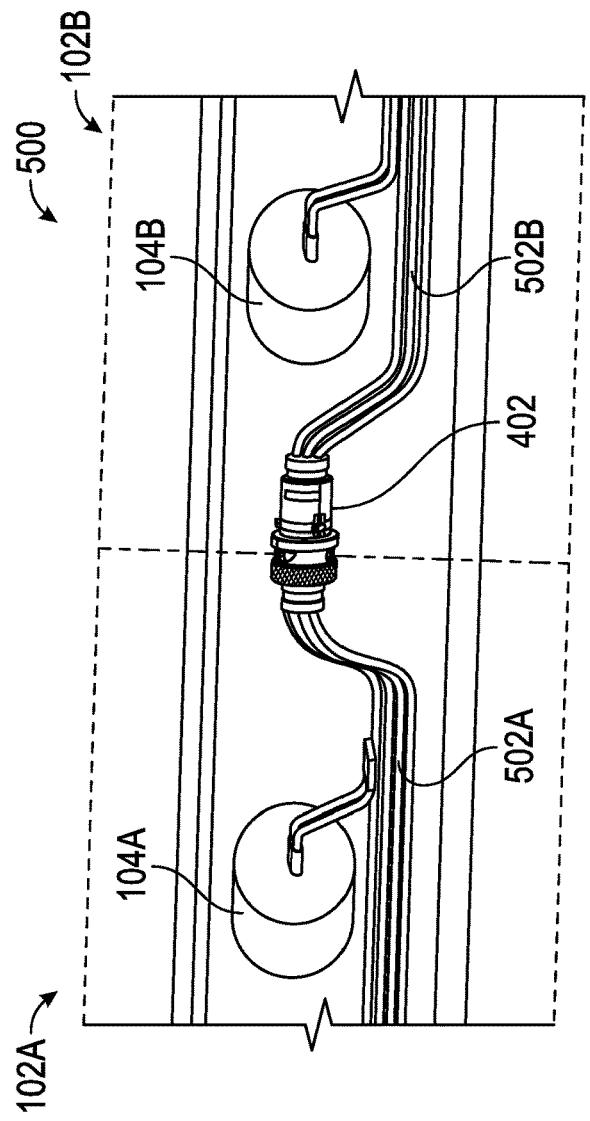
FIG. 5 shows a harness module interconnection in accordance with an embodiment.

The structure of a sensor streamer section in accordance with the principles of the disclosure may be further appreciated by referring to FIG. 3. FIG. 3 shows a portion 300 of a sensor streamer section in accordance with an embodiment. Similar to FIG. 2, a portion of harness module 102A is shown without spacers in place where geophysical sensors 104 are visible, and a harness module 102B is shown in conjunction with spacers in place wherein geophysical sensors 104 may be disposed in an interior volume of spacers 118. A connection between harness modules 102A and 102B not visible in FIG. 3 is shown in FIGS. 4 and 5. Further, a sensor node 106 may similarly be disposed within an interior volume of a spacer 118B. Strength member 116 may be disposed within another trench (not visible in FIG. 3) formed in a wall of spacers 118. The structure of spacers 118 in accordance with various embodiments will be further described in conjunction with FIGS. 15-21 below.

Figure 6:
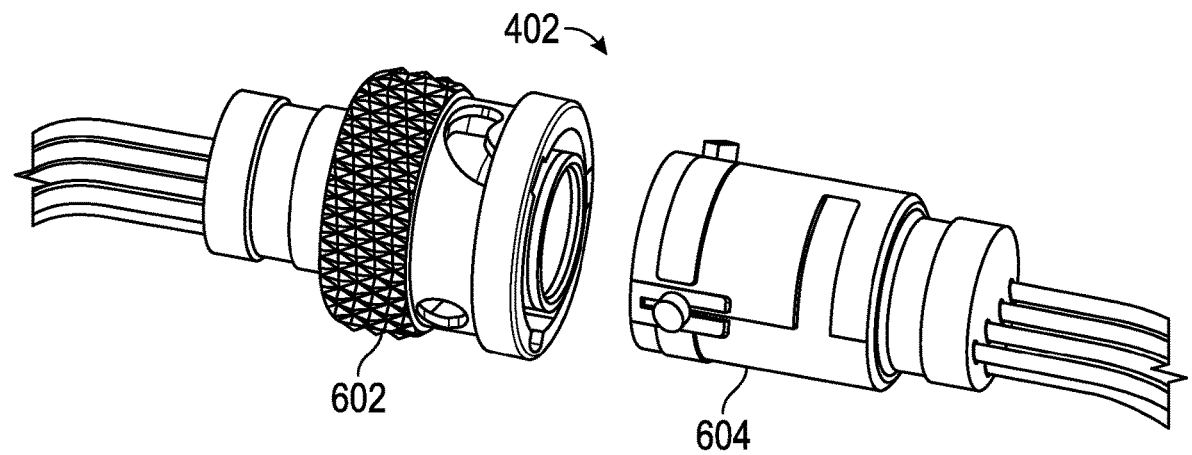
FIG. 6 shows a connector in accordance with an embodiment.

Turning to FIG. 4, FIG. 4 shows cutaway view of a sensor streamer section 100. In FIG. 4, a backbone 114, strength member 116, and spacers 118 have been omitted so the layout of harness modules 102 may be better appreciated. Each harness module 102 may have twelve geophysical sensors 104 coupled in two groups as described further below, to a corresponding sensor node 106. The exemplary embodiment of sensor streamer section 100 includes two harness modules 102A, 102B similar to FIG. 2. The harness modules 102A, 102B may be coupled together at a connection 402. Referring to FIG. 5, showing a harness module interconnection 500 in accordance with an embodiment, connection 402 may include interconnects for cables 502A in harness module 102A and 502B in harness module 102B. Cables 502A, 502B may include electrical cables, optical cables or a combination thereof. Cables 502A may be connected to a sensor node 106A in harness module 102A and carry data from sensor node 106A. As described further below in conjunction with FIG. 22, in operation, the data from a sensor node 106 may include data originating with the geophysical sensors 104, such as geophysical sensor 104A coupled to the corresponding sensor node 106, as well as data originating from sensors in other harness modules coupled together in a sensor streamer section and then in a geophysical survey streamer comprising a plurality of sensor streamer sections coupled together via end connectors 122 (FIG. 4). For example, considering the two harness modules 102A, 102B (FIG. 4), the data from sensor node 106B may include data received from sensor node 106A via cables 502A, connection 402 and cables 502B. This data may be multiplexed with data originating with geophysical sensors 104 coupled to sensor node 106B, such as geophysical sensor 104B, as may be seen in FIG. 7, below. FIG. 6 shows connection 402 in further detail. Connection 402 includes a connector 602, which in the example is a female connector, and a connector 604 which is a complementary male connector in this example. Although connectors 602 and 604 in the exemplary embodiment employ a bayonet type fixture, alternative embodiments may employ a screw type fixture to join the two connectors. Thus, returning to FIG. 4, a harness module 102 may have a connector 602 (FIG. 6) disposed on a first end and a connector 604 disposed on a second end (neither separately visible in FIG. 4) to interconnect harness modules 102.

Figure 7:
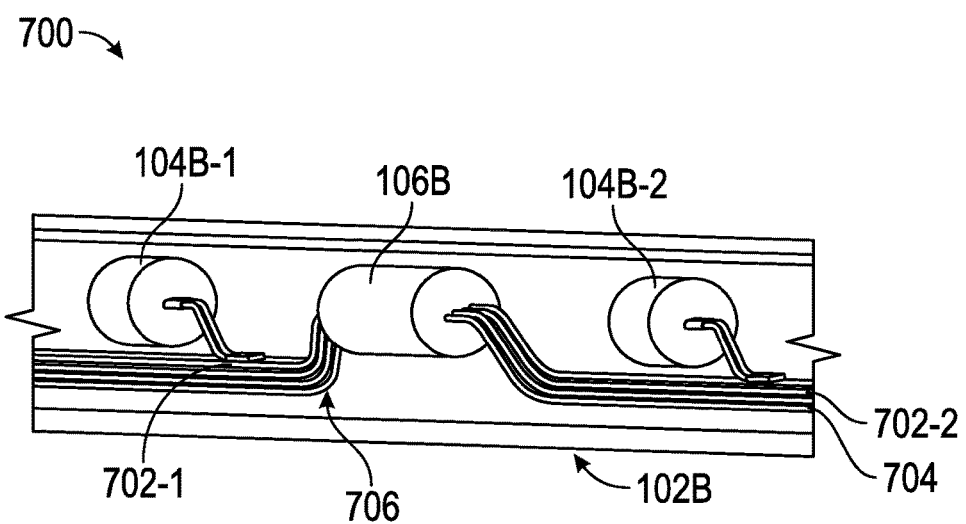
FIG. 7 shows a sensor node interconnection in accordance with an embodiment.

Turning to FIG. 7, FIG. 7 shows a sensor node interconnection 700 in accordance with at least some embodiments. In FIG. 7 a pair of sensors, 104B-1,104B-2 are shown communicatively coupled to a corresponding sensor node 106B. As discussed above, in at least some embodiments, a harness module, e.g. harness module 102B may include twelve geophysical sensors 104 coupled, in two groups, as described further below in conjunction with FIG. 9, to a sensor node 106, e.g. sensor node 106B. Although in the example embodiments, two groups of six sensors are described, other numbers of groups of sensors may be employed. Further the number of sensors in the groups may vary and need not be equal. In at least some embodiments, one or more groups may comprise a single sensor. And, in at least some embodiments, the signals received at a sensor node, e.g. sensor node 106B may comprise a sum of the signals from the sensors in the group. Thus, a geophysical sensor 104B-1 may be a sensor of one of the two groups and geophysical sensor 104B-1 may be a sensor of the other group. Each sensor of the first group e.g. 104B-1, may be coupled to a sensor node 106, e.g. sensor node 106B via one of cables 702-1 in harness module 1026. Similarly, sensors of the second group may be coupled to a sensor node 106, such as sensor node 106B, via one of cables 702-2. Sensor node 106 may also receive data from a sensor node in a harness module distal to a survey vessel via cables 706. Further, the data output from a sensor node in a harness module proximal to a survey vessel may be coupled to a backbone node for transmission to a subsequent sensor streamer section, or ultimately to a data processing system on the survey vessel.

Figure 8:
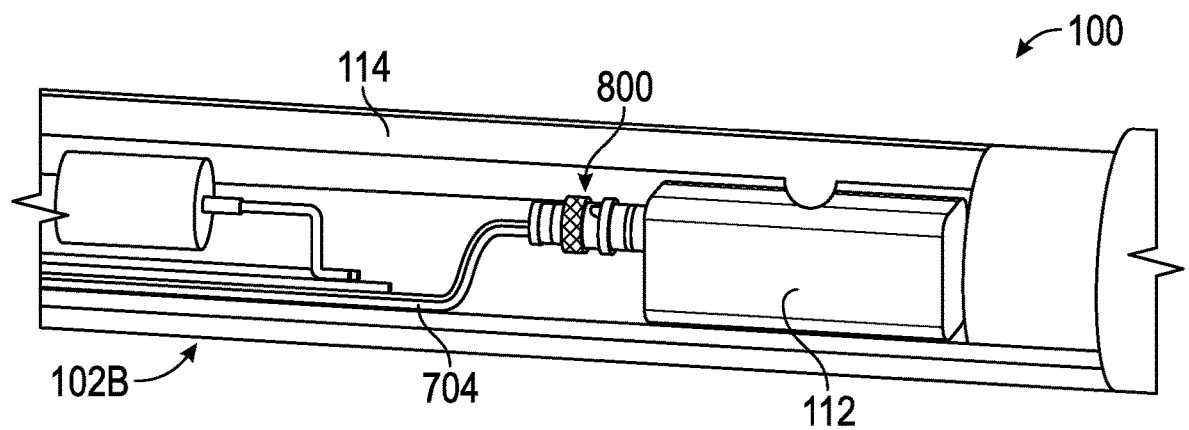
FIG. 8 shows a backbone node connection in accordance with at least some embodiments.

Referring to FIG. 8, FIG. 8 shows a backbone node connection 800 to a backbone node 112 in a streamer section 100 in accordance with at east some embodiments. Taking, by way of example, harness module 102B and sensor node 106B as the harness module sensor node proximal to the survey vessel, then data from the sensor node 106B (FIG. 7) may be communicatively coupled via cables 704 to a backbone node 112. Backbone node 112 may also be coupled to a backbone 114. Backbone node 112 may then multiplex that data with data received from a previous streamer section such as a sensor streamer section 100 (FIGS. 1, 2) to communicate the data to a next streamer section or to the survey vessel.

Figure 9:
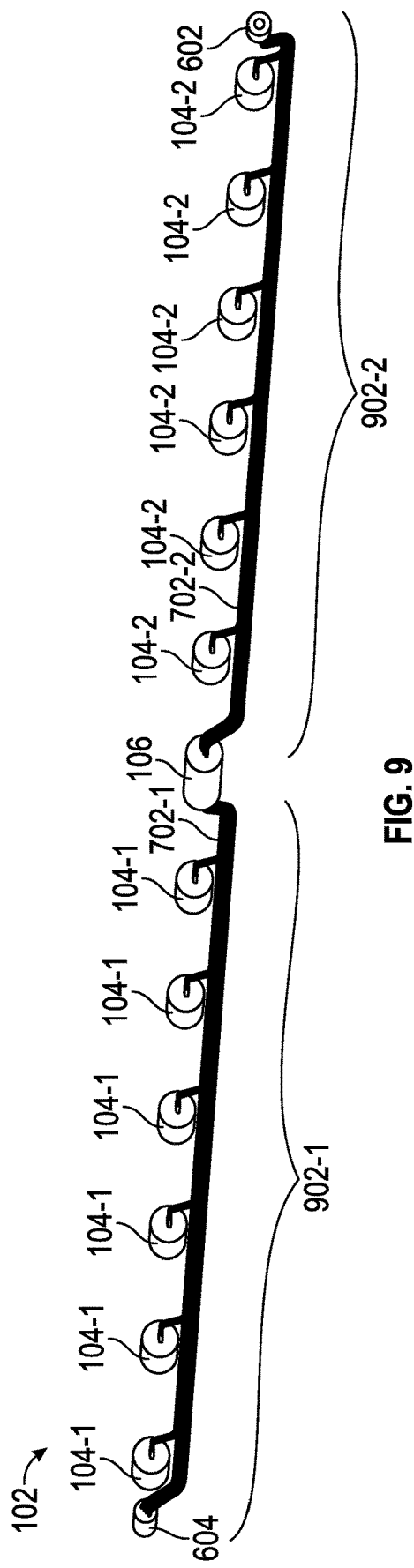
FIG. 9 shows a harness module in accordance with an embodiment.
Figure 10:
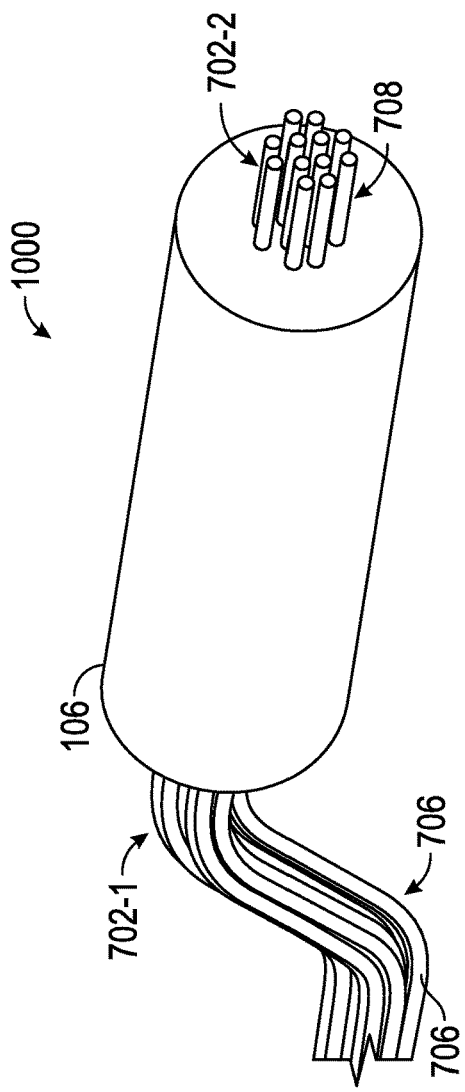
FIG. 10 shows a sensor node cable configuration in accordance with an embodiment.

As previously described, sensors in a harness module 102 may be coupled to a sensor node 106 in two groups with each group disposed on opposite sides of the sensor node. This may be understood by referring to FIG. 9 showing a harness module 102 in accordance with at least some embodiments. A first group 902-1 comprises, in the exemplary embodiment, six geophysical sensors 104-1. Each geophysical sensor 104-1 may be spliced (as shown below in conjunction with FIG. 11) onto a corresponding cable 702-1 coupled to sensor node 106. Similarly, a second group 902-2 comprises, by way of example, six geophysical sensors 104-2. Each geophysical sensor 104-2 may be spliced onto a cable 702-2 coupled to sensor node 106. Thus, referring to FIG. 10, showing a sensor node cable configuration 1000, in the exemplary embodiment, six cables from each group are connected to a sensor node 106. Thus, cables 702-1 comprise cables coupling geophysical sensors 104-1 in group 902-1 (FIG. 9) to sensor node 106. Similarly, cables 702-2 comprise cables coupling geophysical sensors 104-2 in group 902-2 (FIG. 9) to sensor node 106. As described above, in this example embodiment, two groups of six sensors each are employed. However, other numbers of groups comprising various numbers of sensors each may be employed in accordance with the principles of the disclosure. Further, as also described above, a sensor node 106 may receive data from other sensor nodes in harness modules distal to the survey vessel and coupled together as previously described to make up a sensor streamer section. Thus cables 706 may couple sensor node 106 to another sensor node distal to the survey vessel and cables 708 may couple sensor node 106 to another sensor node proximal to the survey vessel. In this aspect, connectors 602 and 604 (FIG. 9) are shown disposed on first and second ends of harness module 102, as described above.

Figure 11:
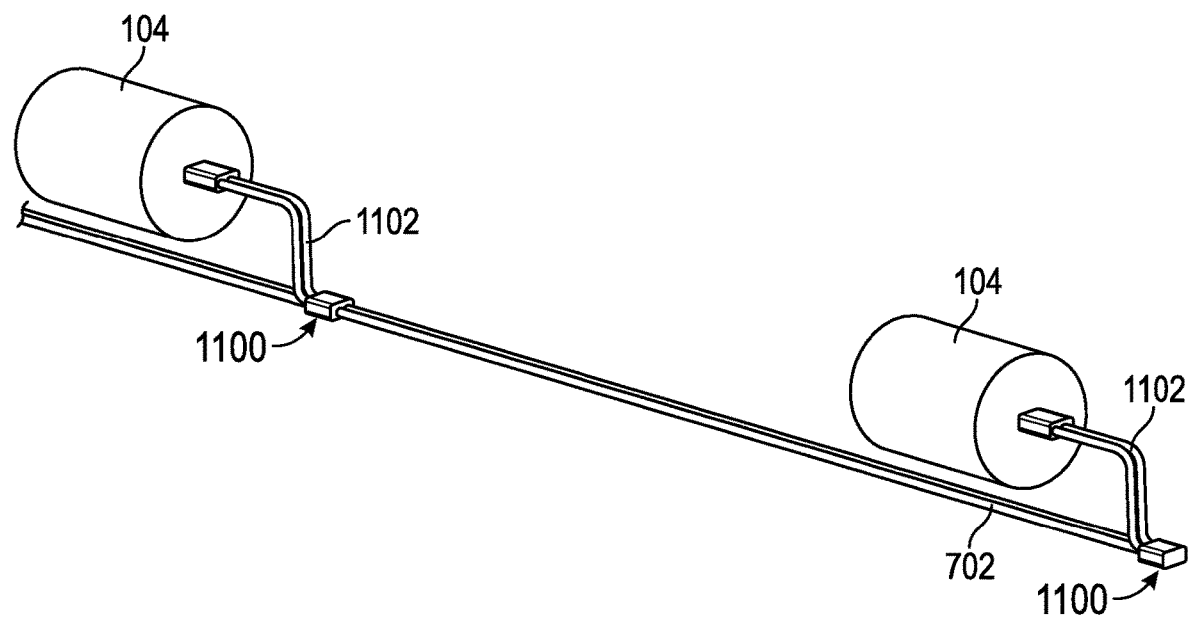
FIG. 11 shows sensor splices in accordance with an embodiment.
Figure 12:
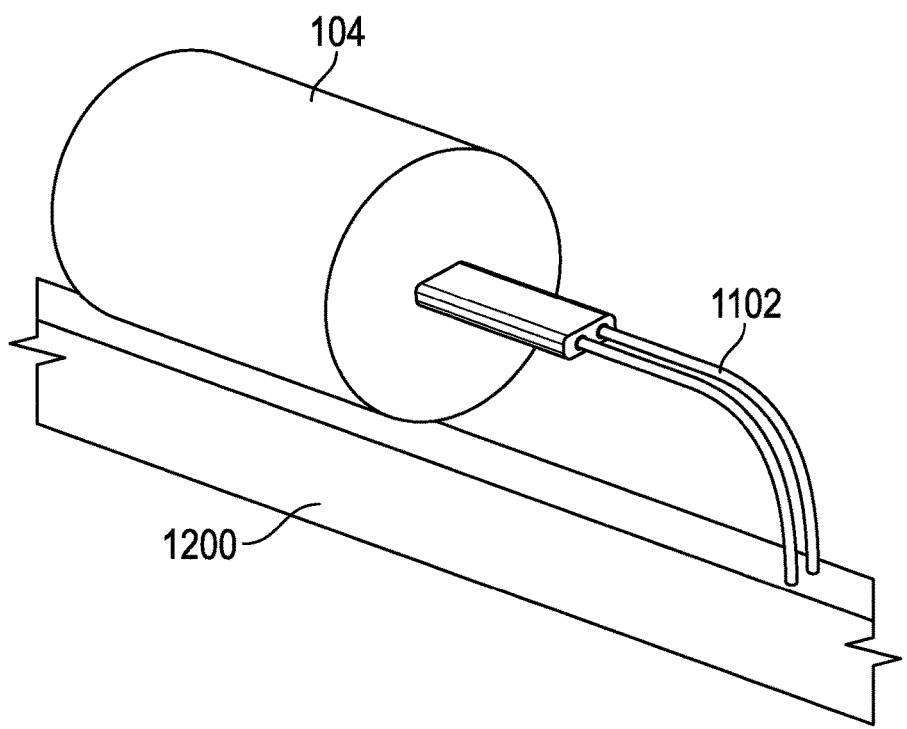
FIG. 12 shows a cable sleeve in accordance with an with an embodiment.

FIG. 11 shows sensor splices 1100 in accordance with at least some embodiments. Geophysical sensors 104 may be spliced onto a cable coupled to a sensor node 106 (not shown in FIG. 11), as previously described. Splices 1100 connect sensor leads 1102 to cables 702 coupled to a sensor node 106 (not shown in FIG. 11). Sensor leads 1102 may include power input and sensor signal output cables, and may be electrical or optical as appropriate to the particular sensor embodiment. Thus, each geophysical sensor 104 may be coupled to a sensor node 106 and communicate data to the sensor node. As described further below in conjunction with FIG. 22, data from a geophysical sensor 104 may be either in digital form or analog form. For example, data from a micro-electromechanical system (MEMS) sensor or a geophone may be in digital form, and data from a hydrophone or accelerometer may be in analog form. Splices 1000 may be fabricated by soldering or crimping, for example, in the case of electrical cables, and by fusion splicing, for example, for optical cables. Splices 1000 may be sealed with, e.g. heat-shrink tubing. Further, in at least some embodiments, heat-shrink tubing with a heat activated adhesive may be used. In still other embodiments, cables may be sealed by over molding. Referring to FIG. 12, a cable sleeve 1200 may be pulled over the cables 702 (not visible in FIG. 12) in fabricating a cable harness 108. In other words, a cable sleeve 1200 may be disposed about the cables 702 included in a cable harness 108. A cable sleeve 1200 bundles the cables in the cable harness, and provides protection. A self-wrap cable sleeve may be used in conjunction with cable sleeve 1200 in at least some embodiments. In other embodiments, a twist-in sleeve may be used. In still other embodiments, a woven sleeve with tape and/or castings may be used.

Figure 13:
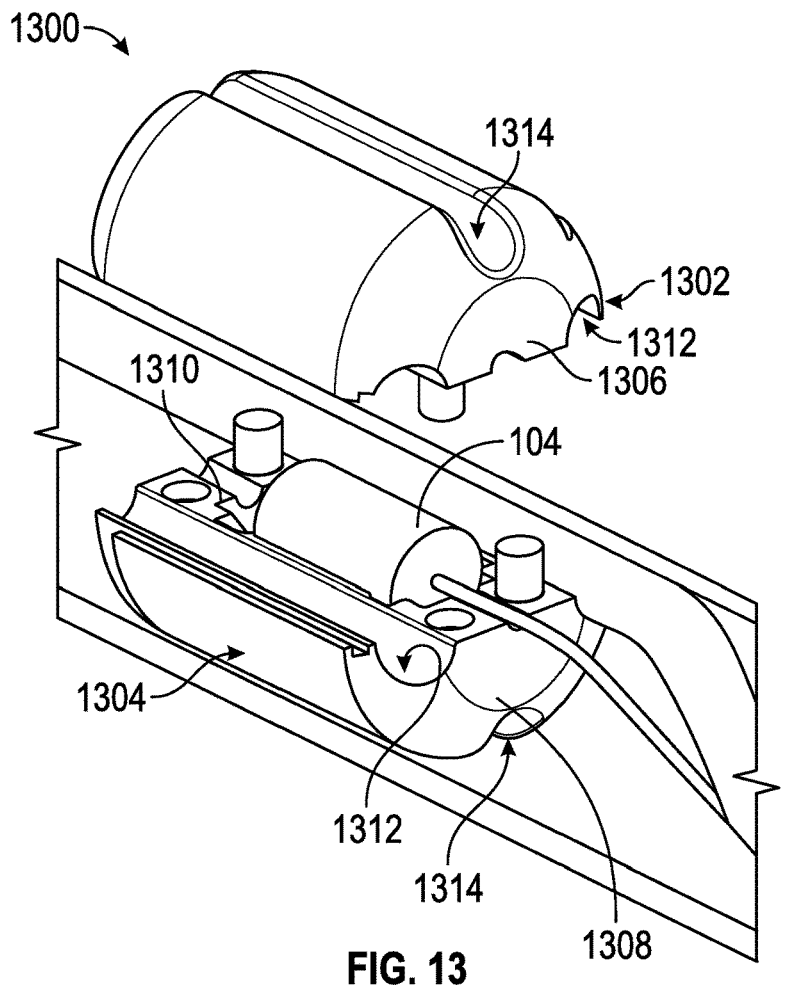
FIG. 13 shows an exploded view of a spacer in accordance with an embodiment.

In FIGS. 13-16 various spacer embodiments and a sensor streamer section configuration in conjunction therewith are shown. The exemplary spacer embodiments in FIGS. 13-16 may be used to provide one or more of the spacers 118 as described above. Turning to FIG. 13, FIG. 13 shows a spacer 1300 in accordance with at least some embodiments. Spacer 1300 may comprise two parts, portion 1302 and portion 1304, which may allow for easy assembly of a sensor streamer section 100 (FIGS. 1, 2). Bodies 1306 and 1308 of portions 1302 and 1304, respectively, may define an interior volume portion 1310 which, when the bodies are assembled, provides an interior volume of a spacer 1300 into which a geophysical sensor 104 may be disposed, as previously described. In other words, when portions 1302 and 1304 are separated, the interior volume comprised of interior volume portions 1310, are exposed, for ease of disposition of a sensor node 106 therein. Further trenches 1312 and 1314 may be formed within walls 1306 and 1308 of portions 1302 and 1304 for receiving a cable harness 108 (not shown in FIG. 13) and a strength member 116 (not shown in FIG. 13), respectively, as described further below. Trenches 1312 and 1314 may provide a passageway for the cable harness and/or strength member along a length of a harness module 102 (FIGS. 1, 2), for example, in which spacers 118 in FIGS. 1 and 2 comprise a spacer 1300. In at least some embodiments, bodies 1306 and 1308 may comprise an engineered thermoplastic such as an ISOPLAST® engineered polymer from Lubrizol Corporation, Wickliffe, Ohio, USA.

Figure 14:
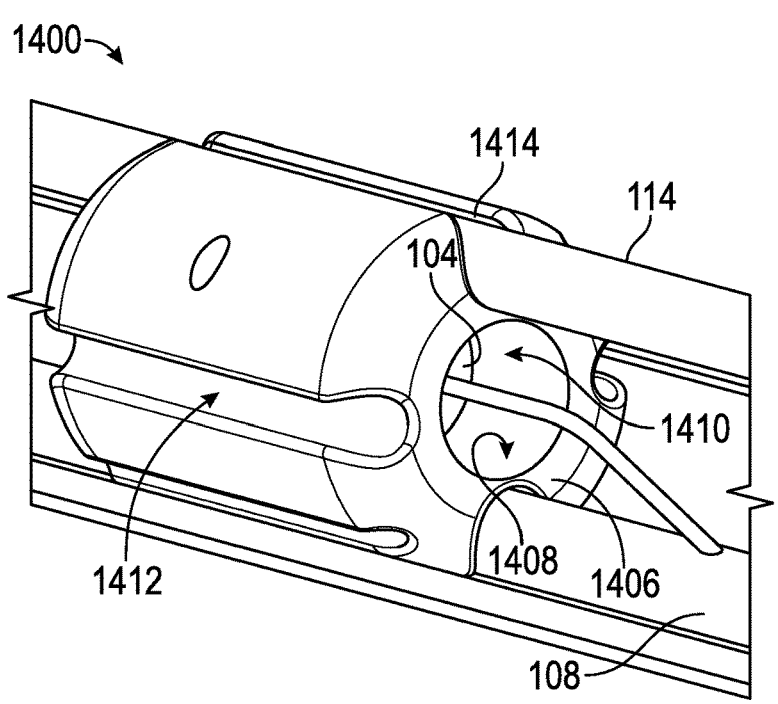
FIG. 14 shows a spacer in accordance with an embodiment.

FIG. 14 shows a spacer 1400 in accordance with at least some embodiments. Spacer 1400 is shown having a unitary construction. However, in an alternative embodiment, it may be constructed in two parts, similar to spacer 1300 (FIG. 13). Spacer 1400 may have trenches 1412 and 1414 formed in a wall 1406 of spacer 1400. A strength member (not shown in FIG. 14) may be disposed in a trench 1412. A cable harness 108 may be disposed within a trench 1414 (not visible in FIG. 14). Further a backbone 114 may be disposed within a trench 1414. Similar to spacer 1300, trenches 1412 and 1414 may provide a passageway for the cable harness and/or strength member along a length of a harness module 102 in FIGS. 1, 2, for example, in which spacers 118 comprise a spacer 1400. The disposition of cable harnesses and backbone within trenches in the wall of a spacer in accordance with the disclosed principles, as shown in FIG. 14, may facilitate the assembly of a sensor streamer section in that the cable harnesses and backbone need not be manually threaded through holes in a spacer. An interior surface 1408 of wall 1406 may define an interior volume 1410 into which a geophysical sensor 104 may be placed, similar to the interior volume 1310 of spacer 1300 (FIG. 13).

Figure 15:
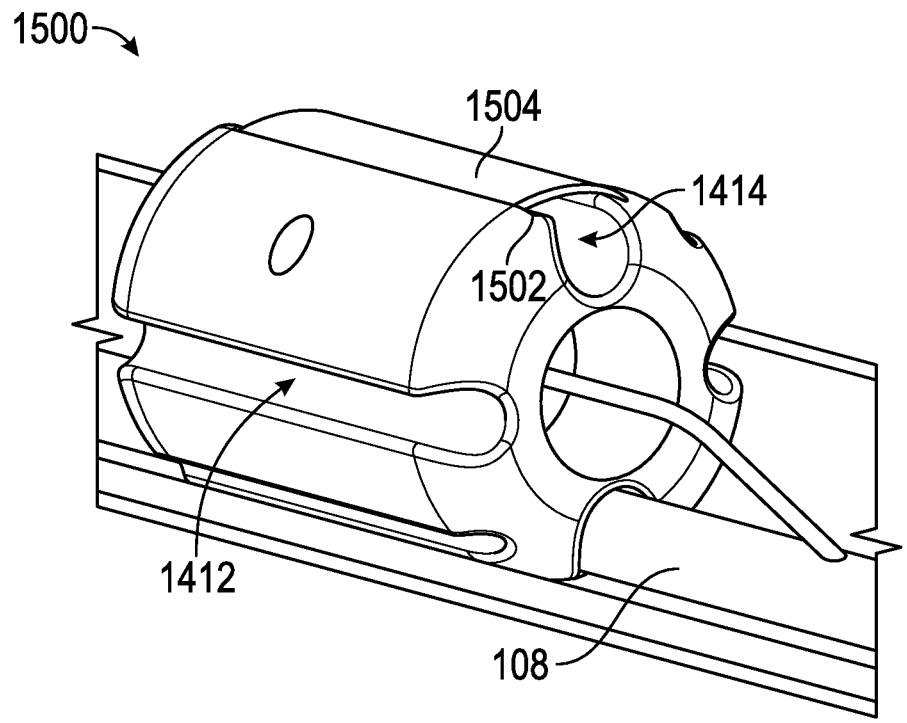
FIG. 15 shows further features of a spacer in accordance with an embodiment.

FIG. 15 shows a spacer 1500 including further features that may be incorporated therewith. Spacer 1500 includes trenches 1412 and 1414 similar to spacer 1400 (FIG. 1400). A trench 1414 may be provided with a groove 1502 for receiving a cover 1504. Cover 1504 may protect a cable harness 108 or backbone 114 (not shown in FIG. 15, for clarity) disposed within, as described in conjunction with FIG. 14.

Figure 16:
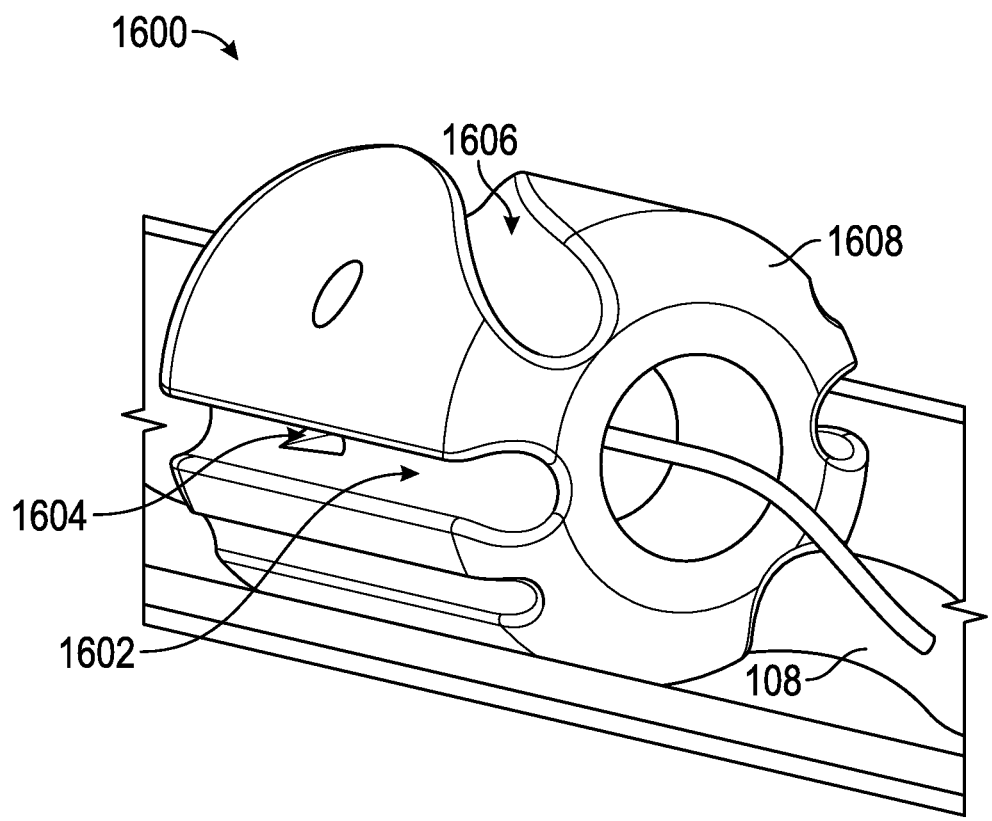
FIG. 16 shows a spacer in accordance with another embodiment.

FIG. 16 shows a spacer 1600 in accordance with at least some alternative embodiments. Spacer 1600 includes a trench 1602 formed within a wall 1608 of spacer 1600 for receiving a strength member 116 (not shown in FIG. 16) as previously described. Trench 1602 includes a spike 1604 which may help retain a strength member (not shown in FIG. 16) disposed within trench 1602, and, in operation, may help transfer towing forces to the spacer. Further, trench 1606 within wall 1608 for receiving a cable harness 108 or backbone 114 (neither shown in FIG. 16 for clarity) may be angled along a length of spacer 1600. Angling the trench 1606 may help protect the cable harness 108 or backbone 114 disposed within.

Figure 17:
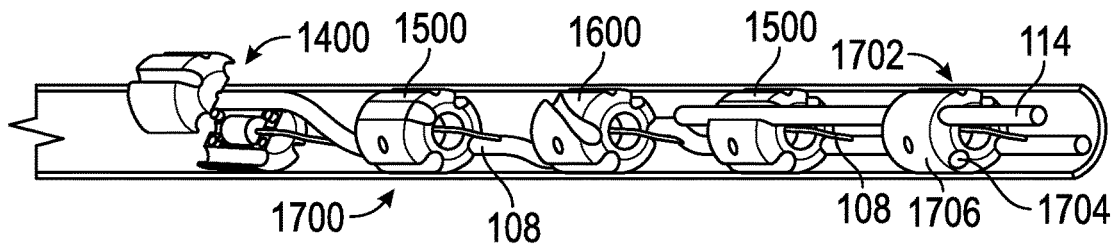
FIG. 17 shows a sensor streamer section portion in accordance with an embodiment.

FIG. 17 shows a portion 1700 of a sensor streamer section, illustrating the various spacers 1400-1600 disposed within. In FIG. 17, spacer 1400 is shown in an exploded view. Further, portion 1700 includes a spacer 1702 having holes 1704 disposed through wall 1706 for passing a strength member 116 (not shown in FIG. 17) and holes (not visible in FIG. 17) for passing a cable harness 108 or backbone 114.

Figure 18:
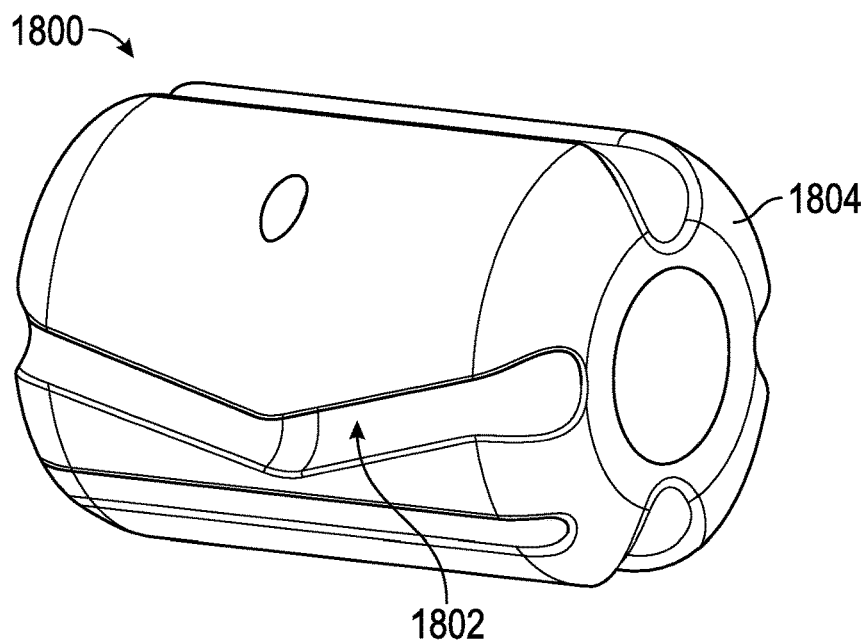
FIG. 18 shows a spacer in accordance with another embodiment

FIGS. 18-21 show further spacer embodiments and a sensor streamer configuration in conjunction therewith. The exemplary spacer embodiments in FIGS. 18-20 may be used to provide one or more of the spacers 118 as described above. Turning to FIG. 18, a spacer 1800 is shown. Spacer 1800 includes a trench 1802 formed in a wall 1804 of spacer 1800 for receiving a strength member 116 (not shown in FIG. 18). Trench 1802 may be angled along a length of spacer 1800 to increase the friction between the strength member and spacer 1800. Similar to the spike 1604 (FIG. 16), this may also help to transfer towing forces to the spacer when in operation. In the example trench 1802, the angle is provided by a "Vee" shape of trench 1802. However, other shapes may be used, —for example, a horizontally oriented "S-shape" having continuously varying angle along the length of the spacer 1800.

Figure 19:
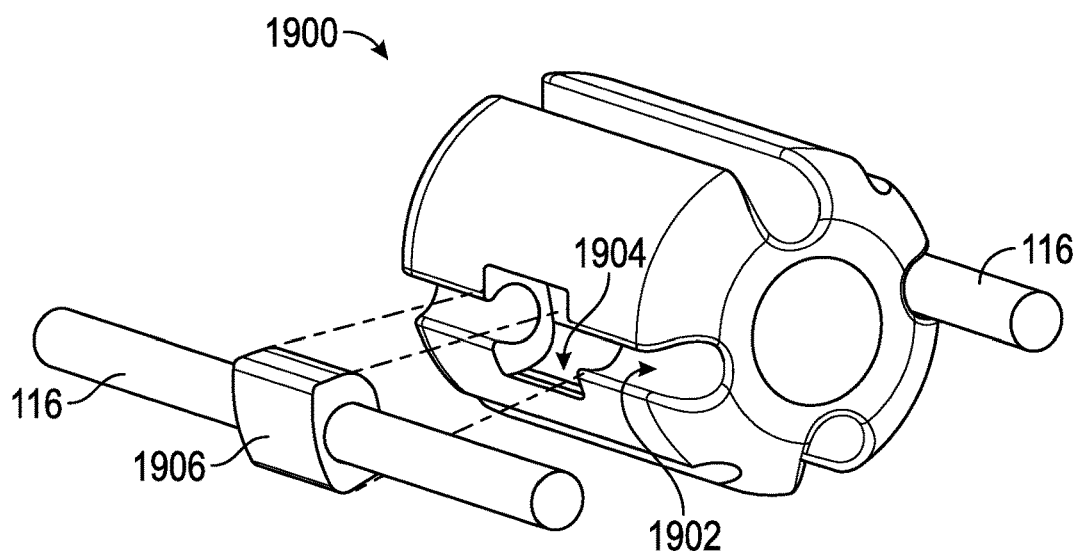
FIG. 19 shows a spacer in accordance with another embodiment.

FIG. 19 shows a spacer 1900 in accordance with at least some alternative embodiments. Spacer 1900 may include a trench 1902 having an indentation 1904 configured to receive and engage with a stop 1906 affixed on a strength member 116. Stop 1906 may be configured to snap into indentation 1904. Alternatively, stop 1906 may be cemented into indentation 1904 with a suitable adhesive material or, may be retained in indentation 1904 using a screw (not shown in FIG. 19).

Figure 20:
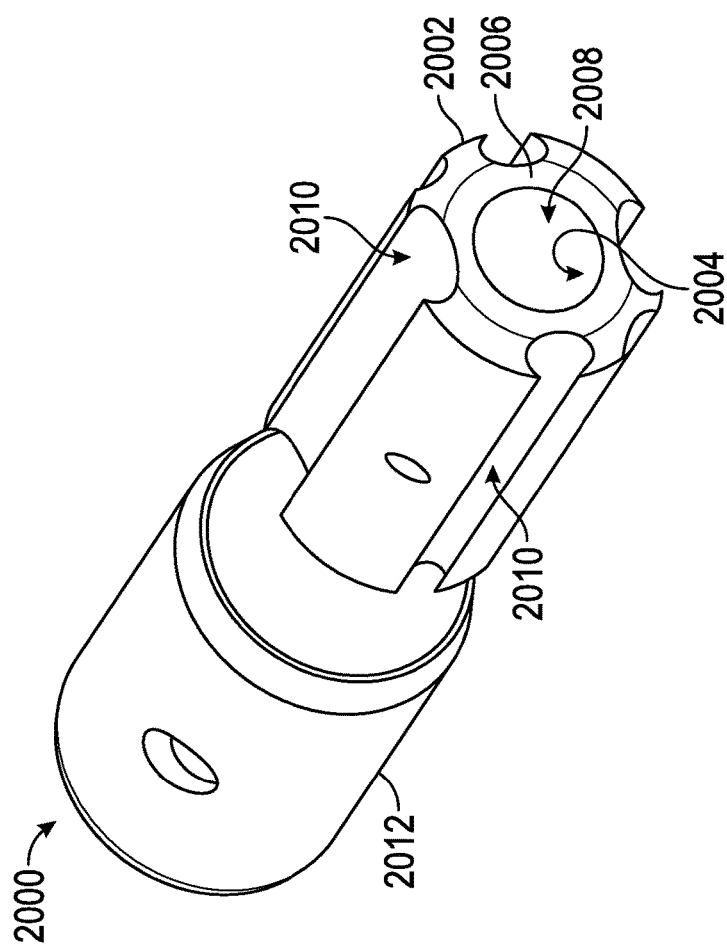
FIG. 20 shows a spacer in accordance with another embodiment.

FIG. 20 shows an exploded view of a spacer 2000 in accordance with at least some other alternative embodiments. Spacer 2000 includes a body 2002 having wall 2006 and an interior wall surface 2004 defining an interior volume 2008. When incorporated into a sensor streamer section, a geophysical sensor 104 (not shown in FIG. 20) may be disposed within interior volume 2008, as previously described. Trenches 2010 for receiving strength members 116, cable harnesses 108 and a backbone 114, as described above, may be formed within the wall 2006. Trenches 2010 may have an oval shape wherein a thickness of wall 2006 may be greater than might otherwise obtain with trenches having a circular shape. A cover 2012 may be disposed over body 2002 to help retain the strength members, cable harnesses and backbones (none shown in FIG. 20) within trenches 2010, as shown in FIG. 21.

Figure 21:
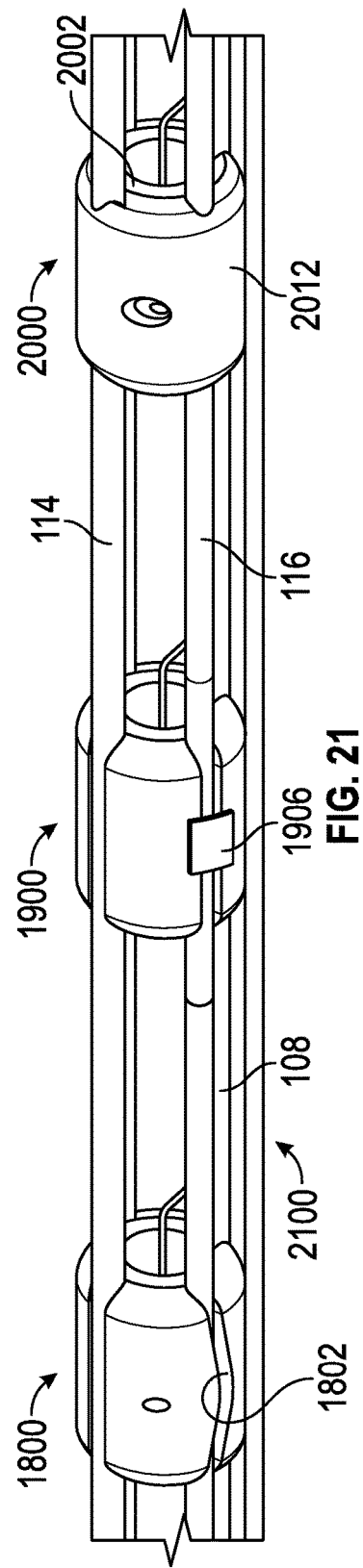
FIG. 21 shows a sensor streamer section portion in accordance with an embodiment.

FIG. 21 shows a sensor streamer section portion 2100 illustrating the various spacers 1800-2100 disposed within. Spacer 2100 is shown with cover 2012 in position over body 2002. Similarly stop 1906 is shown positioned within indentation 1904 (not visible in FIG. 21). A cable harness 108 may be disposed in a trench, e.g. a trench 1314 (FIG. 13). Strength member 116 may also be disposed within a trench 1802 formed in the wall of spacer 1800, as described above in conjunction with FIG. 18.

Figure 22:
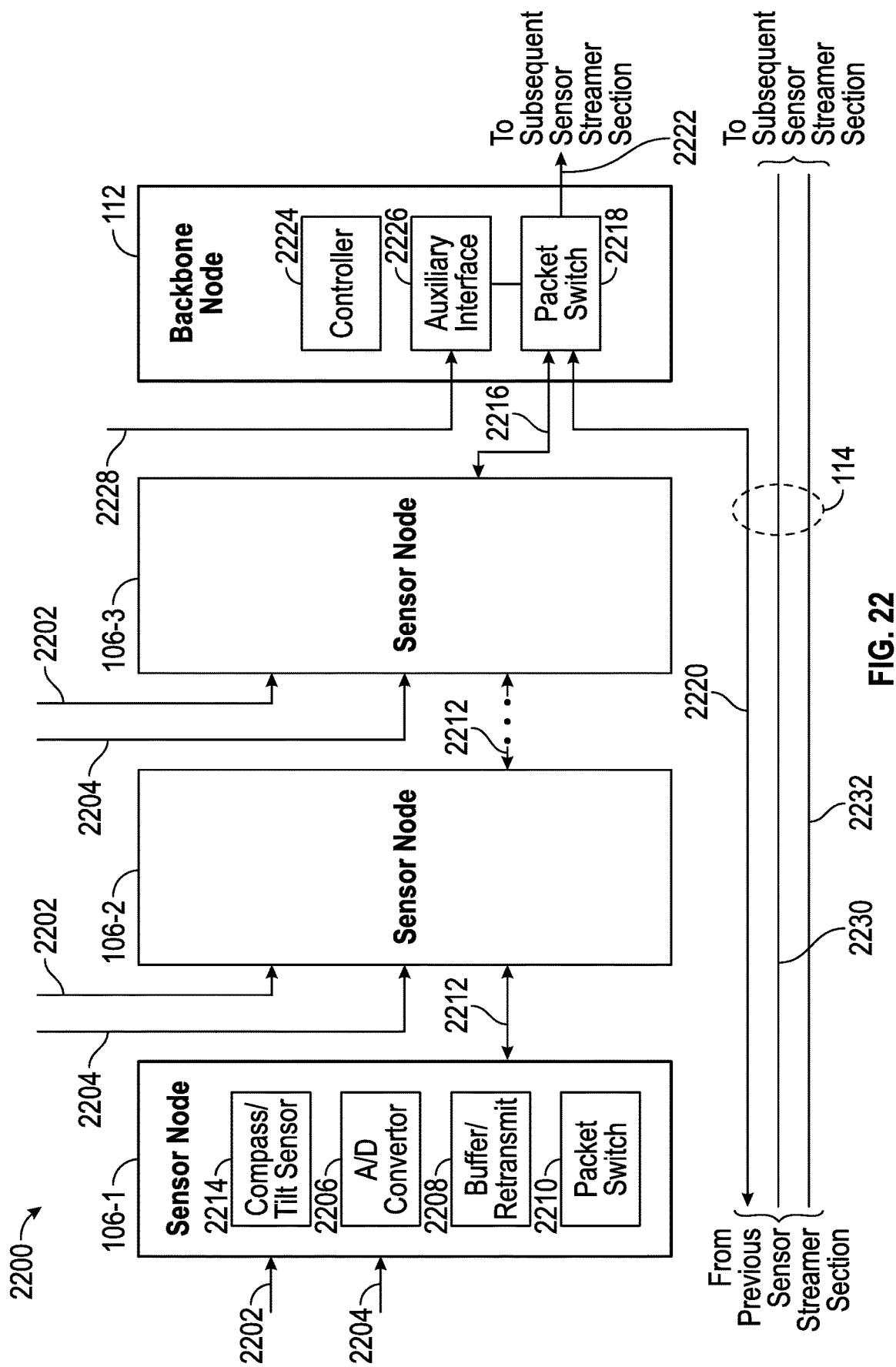
FIG. 22 shows a block diagram of a sensor streamer section data communication system in accordance with an embodiment.

To further appreciate the foregoing principles of the disclosure, FIG. 22 provides a block diagram of a sensor streamer section communication system 2200 (hereinafter simply communication system 2200) in accordance with at least some embodiments. Communication system 2200 may be used in a sensor streamer section comprising a plurality of harness modules 102 as described above in conjunction with, inter alia, FIGS. 1 and 2. In FIG. 22, three sensor nodes, 106-1, 106-2 and 106-3, are shown, however various numbers of sensor nodes 106 may be included in a sensor streamer section in conjunction with each harness module 102 (FIGS. 1, 2). In an exemplary embodiment, a communication system 2200 may include sixteen sensor nodes 106 in conjunction with sixteen harness modules 102. Further, as will be described below, sensor node 106-3 may be a sensor node coupled to a backbone node 112. Between sensor nodes 106-2 and 106-3, various numbers of intermediate sensor nodes 106 (not shown in FIG. 22) may be coupled in daisy chain fashion. For example, a sensor node 106-2 may be coupled to a first connector, e.g. a connector 604 (FIGS. 6 and 9), at a first end of a harness module 102 (FIGS. 1, 2). And, sensor node 106-2 may also be coupled to a second connector, e.g. a connector 602 (FIGS. 6 and 9), at a second end of the harness module 102 (FIGS. 1, 2). Thus, the example sensor node 106-2 is configured to couple to sensor nodes 106-1 and 106-3 in their respective harness modules 102 (FIGS. 1, 2).

Sensor nodes 106 may be configured to receive data from sensors 104 (not shown in FIG. 22) as previously described. Analog data 2202 may be received, for example, from geophysical sensors 104 (not shown in FIG. 22) comprising hydrophones and accelerometers. Digital data 2204 may be received from geophysical sensors 104 comprising, for example, MEMS sensors and geophones.

Analog data may be digitized by an analog-to-digital (ND) converter or ADC 2206 for subsequent transmission to data processing equipment on board a survey vessel (not shown in FIG. 22). Digitized analog data from ADC 2206 and digital data 2204 may be packetized and stored in buffer/retransmit 2208 for transmission, under the control of packet switch 2210, to a subsequent sensor node 106 where it may be aggregated with data from sensors coupled to the subsequent sensor node. Thus, by way of example, sensor node 106-2 may be a subsequent sensor node with respect to sensor node 106-1 wherein the data transmitted from sensor node 106-1 is communicated via data link 2212 to sensor node 106-2.

As noted above, a sensor streamer section 100 (FIG. 1, 2) may comprise a plurality of harness modules 102 (FIG. 1, 2) wherein various numbers of sensor nodes 106 (not shown in FIG. 22) may be coupled together in daisy chain fashion between sensor nodes 106-2 and 106-3. At each such sensor node 106, data received on a data link 2212 may be aggregated with the digitized analog data 2204 and digital data 2206 received at the respective sensor node 106. Sensor node 106-3, which as described above, may be a sensor node proximal to a survey vessel (not shown in FIG. 22) may be coupled to a backbone node 112.

Backbone node 112 may provide telemetry services to the sensor streamer section. The aggregated data from sensor node 106-3 may be coupled, via data link 2216, to a packet switch 2218 within backbone node 112. Packet switch 2218 may also receive aggregated data via data link 2220 from a previous sensor streamer section (not shown in FIG. 22). Packet switch 2218 may then forward the data to a subsequent sensor streamer section (not shown in FIG. 22) on data link 2222. Alternatively, if the sensor streamer section 100 (FIGS. 1, 2) is the streamer section proximal to the survey vessel, data link 2222 may couple to a data processing system on board the vessel. Data links 2212, 2216, 2220 and 2222 may be electrical, optical or combinations thereof. Further, data links 2212 and 2216 may comprise one or more of cables 706 and 704 (FIGS. 7, 10), respectively. Data link 2220 may be included in a backbone 114 (FIGS. 1, 2) which may also include cables to provide redundancy, for example a redundant optical fiber 2230 and a wire pair 2232 for redundant steering control.

A backbone node 112 may also include a controller 2224 and an auxiliary interface 2226. Auxiliary interface 2226 may, for example, receive acoustic positioning data 2228 from acoustic positioning devices (not shown in FIG. 22) associated with a sensor streamer section employing a communication system 2200. Controller 2224 may provide control information to packet switch 2218. Controller 2224 may also provide control information to, for example, steering devices (not shown) coupled between sensor streamer sections comprising a seismic streamer. The control information may be based, at least in part, on acoustic positioning data 2228. In this respect, one or more of data links 2212, 2216, 2220 and 2222 may be bi-directional links wherein control information may be transmitted to sensor streamer sections comprising a seismic streamer and positioned distal to the survey vessel. Although backbone node 112 is shown as an integrated unit, in alternative embodiments, backbone node 112 may comprise discrete units within a sensor streamer section 100 (FIGS. 1, 2).

In at least some embodiments of sensor nodes 106, a compass/tilt sensor 2214 may be provided. Compass/tilt sensor 2214 may be used to provide data with respect to the orientation of the sensor streamer section incorporating the communication system 2200. For example, a compass/tilt sensor 2214 may be used with sensor streamer sections employing geophysical sensors 104 (not shown in FIG. 22) comprising piezoelectric accelerometer-based motion sensors. In contrast, a compass/tilt sensor 2214 may not be needed with sensor streamer sections employing geophysical sensors 104 (not shown in FIG. 22) comprising MEMS-based motion sensors, as a DC value from the MEMS-based motion sensor provides a measurement of the gravitational field at the position of the sensor streamer section, which can be used to determine the orientation of the sensor streamer section.

Figure 23:
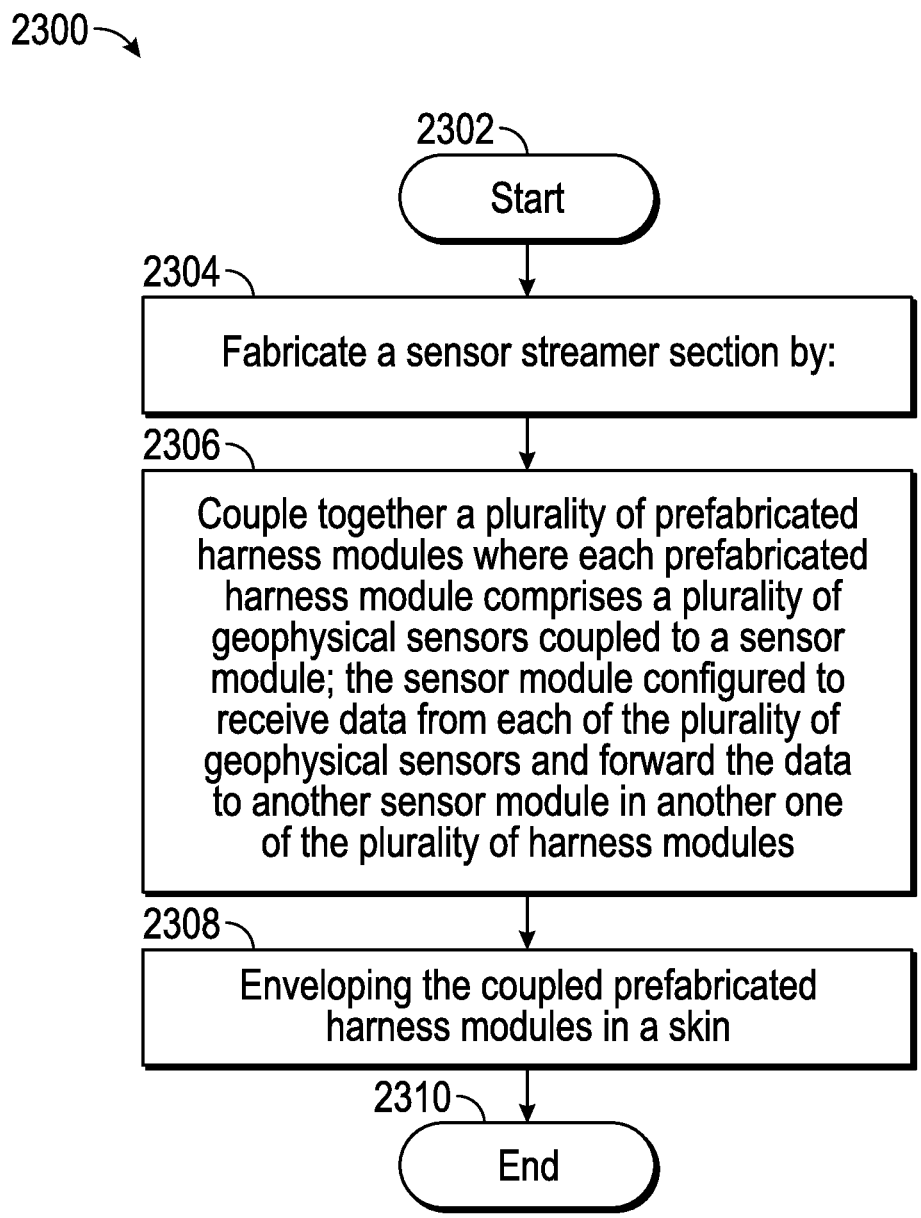
FIG. 23 shows a flow chart of a method in accordance with an embodiment.

FIG. 23 shows a flow chart of a method 2300 in accordance with at least some embodiments. Method 2300 starts at block 2302. In block 2304, a sensor streamer section is fabricated by coupling together a plurality of prefabricated harness modules, block 2306, wherein each prefabricated harness module comprises a plurality of geophysical sensors coupled to a sensor node. The sensor node is configured to receive data from each of the plurality of geophysical sensors and to forward the data to another sensor node in another one of the prefabricated harness modules. In block 2308, the coupled prefabricated harness modules are enveloped in a skin. The skin may be filled with a gel. In at least some embodiments, fabricating a sensor streamer section may further comprise disposing each geophysical sensor in each harness module in an interior volume of a spacer, and disposing the cable harness in a trench formed in a wall of each spacer. Further, fabricating a sensor streamer section may include disposing a strength member in another trench formed in the wall of each spacer.

Fabricating a sensor streamer section may further include coupling one of the prefabricated harness modules to a backbone node configured to forward data received from one of the prefabricated harness modules to another sensor streamer section or to a survey vessel.

The harness modules may be prefabricated by, for each geophysical sensor in each prefabricated harness module, splicing a lead from the geophysical sensor to a cable disposed within a cable harness comprising a plurality of cables, the cable coupled to a corresponding one of the sensor nodes. Splicing may include soldering, crimping in the case of electrical cables, or fusion splicing in the case of optical cables. In at least some embodiments, prefabricating each harness module may further comprise attaching a first connector on a first end of the prefabricated harness module and a second connector on a second end of the prefabricated harness module, the first and second connectors configured to couple together the harness modules, and wherein when coupled together, data from a sensor node in a first harness module is configured to communicate data to a sensor node in a second harness module coupled to the first harness module. Further, the prefabricating may include disposing a cable sleeve about the cables in the cable harness.

The above discussion is meant to be illustrative of the principles and various embodiments of the present invention. Numerous variations and modifications will become apparent to those skilled in the art once the above disclosure is fully appreciated. For example, various numbers of sensor streamer sections may be coupled in a geophysical survey streamer, and each streamer section may include various numbers of coupled prefabricated harness modules. It is intended that the following claims be interpreted to embrace all such variations and modifications.

What is claimed is:
1. A method of fabricating a streamer section comprising:
   prefabricating harness modules to create a plurality of prefabricated harness modules, each prefabricated harness module comprising a first connector at a first end and a second connector at a second end, and each prefabricated harness module having a length shorter than the streamer section;

coupling together the plurality of prefabricated harness modules by way of their respective connectors, wherein each prefabricated harness module comprises a plurality of geophysical sensors coupled to a sensor node, the sensor node configured to receive data from each of the plurality of geophysical sensors and to forward the data to another sensor node in another one of the plurality of prefabricated harness modules; and enveloping the coupled plurality of prefabricated harness modules in a skin.

2. The method of claim 1 wherein prefabricating the harness modules further comprises:

for each geophysical sensor in each prefabricated harness module, splicing a lead from the geophysical sensor to a cable disposed within a cable harness comprising a plurality of cables, the cable coupled to a corresponding one of the sensor nodes.

3. The method of claim 2 wherein prefabricating each harness module further comprises attaching a first connector on a first end of the prefabricated harness module and a second connector on a second end of the prefabricated harness module, the first and second connectors configured to couple together the prefabricated harness modules, and wherein when coupled together, data from a sensor node in a first harness module is configured to communicate data to a sensor node in a second harness module coupled to the first harness module.

4. The method of claim 2 wherein the fabricating further comprises:

disposing each geophysical sensor in each harness module in an interior volume of a spacer; and disposing the cable harness in a first trench formed in a wall of each spacer.

5. The method of claim 4 wherein the fabricating comprises disposing a strength member in a second trench formed in the wall of each spacer.

6. The method of claim 2 wherein the prefabricating the harness module further comprises disposing a cable sleeve about the cable harness.

7. The method of claim 3 wherein the splicing comprises soldering, crimping or fusion splicing.

8. The method of claim 1 further comprises filling the skin with gel.

9. The method of claim 1 further comprising coupling one of the prefabricated harness modules to a backbone node configured to forward data received from the one of the prefabricated harness modules to another sensor streamer section or to a survey vessel.

10. A sensor streamer section comprising:

a first end connector on a first end of the sensor streamer section, the first end connector configured to couple an end connector another sensor streamer section;

a second end connector on a second end of the sensor streamer section opposite the first end, the second end connector configured to couple to an end connector of another sensor streamer section;

a streamer skin coupled between the first end connector and the second end connector;

a plurality of harness modules coupled together and disposed within the streamer skin, each harness module comprising:

a plurality of geophysical sensors disposed along a length of the harness module;

a sensor node communicatively coupled to the plurality of geophysical sensors, the sensor node configured to receive data from each of the plurality of geophysical sensors and send the data to another sensor node or a backbone node communicatively coupled to the harness module;

a first harness connector disposed at a first end of the harness module; and a second harness connector disposed at a second end of the harness module, wherein;

the first harness connector is coupled to the sensor node and is configured to couple to a second harness module and receive data from a sensor node in the second harness module; and the second harness connector is coupled to the sensor node and is configured to couple to a third harness module and forward data to a sensor node in the third harness module.

11. The sensor streamer section of claim 10 wherein each sensor node of the plurality of harness modules are communicatively coupled, a first sensor node of the plurality in a first harness module configured to forward data to a second sensor node of the plurality in a second harness module, and the second sensor node aggregating the forwarded data and data received by the second sensor node from one or more geophysical sensors communicatively coupled thereto.

12. The sensor streamer section of claim 11 further comprising the backbone node, the backbone node having a switch communicatively coupled to one of the sensor nodes of the of the plurality of harness modules, the switch configured to communicate data to a next sensor streamer section or to a survey vessel.

13. The sensor streamer section of claim 12 wherein the switch is configured to aggregate data from the one of the sensor nodes and data from a previous sensor streamer, and wherein the switch is further configured to communicate the aggregated data to the next sensor streamer section.

14. The sensor streamer section of claim 10 wherein each geophysical sensor of the plurality of geophysical sensors is disposed in an interior volume of a spacer.

15. The sensor streamer section of claim 14 wherein at least one of the spacers comprises a trench disposed in a wall thereof, the trench providing a passageway for a strength member disposed along a length of each harness module.

16. The sensor streamer section of claim 14 wherein:

at least one of the spacers comprises a trench formed in a wall thereof, the trench providing a passageway for a cable harness disposed along a length of each harness module; and the cable harness comprises a plurality of cables, each cable of the plurality of cables coupled to one of the sensor nodes of the harness module.

17. The sensor streamer section of claim 16 wherein the trench is angled along a length of the spacer.

18. The sensor streamer section of claim 14 wherein at least one of the spacers comprises a first portion configured to separate from a second portion to expose the interior volume of the spacer.

* * * * *